(12) United States Patent
Zahlen et al.

(10) Patent No.: US 9,902,483 B2
(45) Date of Patent: Feb. 27, 2018

(54) WINDOW PANEL FOR AN AIRFRAME AND METHOD OF PRODUCING SAME

(71) Applicant: Airbus Operations GmbH, Hamburg (DE)

(72) Inventors: Pierre C. Zahlen, Stade (DE); Johannes Born, Bremen (DE); Lars Meyer, Hamburg (DE); Gregor Baumbach, Hamburg (DE); Claus Hanske, Hamburg (DE); Jens Prowe, Hamburg (DE); Johan Oentoro, Hamburg (DE); M. Ichwan Zuardy, Hamburg (DE); Wouter Brok, Pölitz (DE); Martin Metten, Seevetal (DE)

(73) Assignee: Airbus Operations GmbH, Hamburg (DE)

(*) Notice: Subject to any disclaimer, the term of this patent is extended or adjusted under 35 U.S.C. 154(b) by 190 days.

(21) Appl. No.: 14/469,146

(22) Filed: Aug. 26, 2014

(65) Prior Publication Data
US 2015/0064389 A1 Mar. 5, 2015

(30) Foreign Application Priority Data
Aug. 28, 2013 (EP) .................................... 13182096

(51) Int. Cl.
| | | |
|---|---|---|
| *B32B 3/24* | (2006.01) | |
| *B32B 3/26* | (2006.01) | |
| *B32B 5/18* | (2006.01) | |
| *B32B 5/24* | (2006.01) | |
| *B32B 5/26* | (2006.01) | |
| *B32B 5/28* | (2006.01) | |
| *B32B 7/04* | (2006.01) | |
| *B60J 1/00* | (2006.01) | |

(Continued)

(52) U.S. Cl.
CPC .......... *B64C 1/1484* (2013.01); *B29C 70/026* (2013.01); *B32B 3/08* (2013.01);
(Continued)

(58) Field of Classification Search
None
See application file for complete search history.

(56) References Cited

U.S. PATENT DOCUMENTS 1,073,805 A 9/1913 Kinnear
1,325,363 A * 12/1919 Lindsay ............ B32B 17/10036
156/148

(Continued)

FOREIGN PATENT DOCUMENTS

CH 216 624 9/1941
DE 31 41 869 5/1983

(Continued)

OTHER PUBLICATIONS

International Search Report for Application No. PCT/US01/30299 dated Feb. 14, 2002.

(Continued)

*Primary Examiner* — Jeff Vonch
(74) *Attorney, Agent, or Firm* — Jenkins, Wilson, Taylor & Hunt, P.A.

(57) ABSTRACT

The present disclosure pertains to a window panel for a body structure of a vehicle, especially an airframe of an aircraft or spacecraft, including a first skin which extends over a first side of the panel to form an outer skin of the vehicle body structure; a second skin which extends over a second side of the panel to form an inner skin of the vehicle body structure; and a core, especially a foam core, located between and covered by the first and second skins in a sandwich structure. The window panel includes at least one window aperture formed through the first layer, the core, and the second layer. The core may be confined to or extends over a limited extent, region or part of the panel. Thus, the first skin and/or the second skin may extend over or cover a greater area of the panel than the core.

8 Claims, 6 Drawing Sheets

(51) Int. Cl.

| | | |
|---|---|---|
| *B64C 1/14* | (2006.01) | |
| *B29C 70/02* | (2006.01) | |
| *B32B 3/08* | (2006.01) | |
| *B32B 37/16* | (2006.01) | |
| *B32B 37/30* | (2006.01) | |
| B32B 37/12 | (2006.01) | |
| B32B 38/04 | (2006.01) | |
| B29C 70/30 | (2006.01) | |
| B29L 7/00 | (2006.01) | |
| B32B 3/02 | (2006.01) | |
| B29C 70/54 | (2006.01) | |
| B29L 9/00 | (2006.01) | |
| B29L 31/30 | (2006.01) | |
| B29L 31/00 | (2006.01) | |
| B64C 1/12 | (2006.01) | |
| B64C 1/00 | (2006.01) | |

(52) U.S. Cl.
CPC .............. *B32B 3/263* (2013.01); *B32B 3/266* (2013.01); *B32B 5/18* (2013.01); *B32B 5/245* (2013.01); *B32B 7/04* (2013.01); *B32B 37/16* (2013.01); *B32B 37/30* (2013.01); *B64C 1/1492* (2013.01); B29C 70/023 (2013.01); B29C 70/30 (2013.01); B29C 70/545 (2013.01); B29C 2793/0018 (2013.01); B29C 2793/0081 (2013.01); B29L 2007/002 (2013.01); B29L 2009/00 (2013.01); B29L 2031/005 (2013.01); B29L 2031/30 (2013.01); B29L 2031/3082 (2013.01); B32B 3/02 (2013.01); B32B 5/26 (2013.01); B32B 5/28 (2013.01); B32B 38/04 (2013.01); B32B 2250/03 (2013.01); B32B 2250/24 (2013.01); B32B 2250/40 (2013.01); B32B 2250/44 (2013.01); B32B 2260/00 (2013.01); B32B 2266/08 (2013.01); B32B 2305/022 (2013.01); B32B 2305/07 (2013.01); B32B 2605/00 (2013.01); B32B 2605/006 (2013.01); B32B 2605/18 (2013.01); B60J 1/00 (2013.01); B60J 1/004 (2013.01); B60J 1/006 (2013.01); B64C 1/12 (2013.01); B64C 1/14 (2013.01); B64C 2001/0072 (2013.01); Y02T 50/433 (2013.01); Y10T 428/239 (2015.01); Y10T 428/24322 (2015.01); Y10T 428/24521 (2015.01)

(56) References Cited

U.S. PATENT DOCUMENTS

| | | | |
|---|---|---|---|
| 1,793,127 A | 2/1931 | Osius | |
| 2,720,948 A * | 10/1955 | Pajak | E04C 2/365 156/65 |
| 3,429,530 A * | 2/1969 | Hertel | B64C 1/1484 105/396 |
| 3,578,526 A * | 5/1971 | Harding | B64C 1/06 156/197 |
| 3,785,788 A * | 1/1974 | Haggberg | B21D 47/00 29/423 |
| 3,879,245 A * | 4/1975 | Fetherston | A63C 5/12 156/245 |
| 4,450,661 A * | 5/1984 | Whitener | B64C 1/1484 244/120 |
| 4,451,595 A | 5/1984 | Lee | |
| 4,475,765 A | 10/1984 | Vogt et al. | |
| 4,479,621 A | 10/1984 | Bergholz | |
| 4,542,056 A | 9/1985 | Anglin et al. | |
| 5,041,318 A * | 8/1991 | Hulls | B29C 65/562 296/181.3 |
| 5,271,581 A | 12/1993 | Irish | |
| 5,452,867 A * | 9/1995 | Grunwald | B64C 3/24 156/173 |
| 5,685,940 A * | 11/1997 | Hopkins | G10K 11/172 156/286 |
| 5,688,353 A | 11/1997 | Dublinski | |
| 6,180,206 B1 * | 1/2001 | Kain, Jr. | B32B 3/12 156/292 |
| 6,485,594 B1 * | 11/2002 | Pabsch | B29D 99/0021 156/212 |
| 7,780,808 B2 * | 8/2010 | Godbehere | B29C 70/30 156/166 |
| 8,366,042 B2 | 2/2013 | Haselmeier et al. | |
| 8,985,512 B1 * | 3/2015 | Chan | B64C 1/061 244/120 |
| 2003/0021958 A1 * | 1/2003 | Godbehere | B29C 70/30 428/189 |
| 2003/0126830 A1 * | 7/2003 | Cho | B32B 3/12 52/783.1 |
| 2003/0234322 A1 * | 12/2003 | Bladt | B64C 1/1484 244/129.3 |
| 2004/0155148 A1 * | 8/2004 | Folkesson | B32B 5/18 244/119 |
| 2005/0103942 A1 * | 5/2005 | Abrams | B60J 1/006 244/165 |
| 2005/0247822 A1 * | 11/2005 | Salmon | B29C 70/763 244/129.3 |
| 2006/0123718 A1 * | 6/2006 | Paspirgilis | B64C 1/1492 52/204.1 |
| 2006/0188696 A1 * | 8/2006 | Grose | B32B 3/02 428/156 |
| 2007/0009712 A1 * | 1/2007 | Roth | B29C 70/088 428/172 |
| 2007/0175573 A1 * | 8/2007 | Fox | B29C 70/34 156/196 |
| 2007/0193146 A1 * | 8/2007 | Carstensen | B64D 9/003 52/268 |
| 2007/0228217 A1 * | 10/2007 | Bold | B64C 1/1492 244/129.3 |
| 2008/0048068 A1 * | 2/2008 | Bold | B29C 70/42 244/129.3 |
| 2008/0067288 A1 * | 3/2008 | Eberth | B64C 1/12 244/129.3 |
| 2008/0078876 A1 * | 4/2008 | Baggette | B29C 70/446 244/129.3 |
| 2008/0078878 A1 * | 4/2008 | Bold | B29C 70/48 244/129.3 |
| 2008/0105785 A1 * | 5/2008 | Griess | B64C 1/068 244/120 |
| 2008/0169380 A1 * | 7/2008 | Jackson | B64C 1/1492 244/129.3 |
| 2008/0191095 A1 * | 8/2008 | Bold | B29C 70/48 244/129.3 |
| 2008/0217479 A1 * | 9/2008 | Wood | B60J 1/006 244/129.3 |
| 2009/0084900 A1 * | 4/2009 | Krahn | B64C 1/1492 244/129.3 |
| 2009/0230246 A1 * | 9/2009 | Depeige | B64C 1/1492 244/129.3 |
| 2009/0294591 A1 * | 12/2009 | Ramirez Blanco | B64C 1/1446 244/129.4 |
| 2010/0043955 A1 * | 2/2010 | Hornick | B29C 65/5057 156/182 |
| 2010/0044513 A1 * | 2/2010 | Gallant | B64C 1/1492 244/129.3 |
| 2011/0042516 A1 * | 2/2011 | Dolzinski | B64C 1/1492 244/129.3 |
| 2011/0108667 A1 * | 5/2011 | Keller | B29C 51/082 244/119 |
| 2011/0217510 A1 * | 9/2011 | Harasse | B64C 1/1446 428/137 |
| 2012/0056037 A1 * | 3/2012 | Dolzinski | B64C 1/064 244/119 |
| 2012/0135180 A1 | 5/2012 | Weber et al. | |
| 2012/0286093 A1 * | 11/2012 | Noebel | B64C 1/061 244/119 |

(56) References Cited

U.S. PATENT DOCUMENTS

| | | | | |
|---|---|---|---|---|
| 2013/0043348 | A1* | 2/2013 | Milliere | B64C 1/1492 244/129.3 |
| 2013/0062352 | A1* | 3/2013 | Tachibana | B64C 1/14 220/378 |
| 2013/0266756 | A1* | 10/2013 | Zuardy | B64C 3/20 428/76 |
| 2013/0306794 | A1* | 11/2013 | Zahlen | B64C 1/068 244/118.5 |
| 2014/0197271 | A1* | 7/2014 | Maloney | B60N 2/4242 244/17.21 |
| 2015/0191181 | A1* | 7/2015 | Bissels | B61D 25/00 52/204.1 |
| 2015/0273787 | A1* | 10/2015 | Nansen | B32B 3/12 428/116 |

FOREIGN PATENT DOCUMENTS

| | | | |
|---|---|---|---|
| DE | 10 2008 060550 | | 6/2010 |
| EP | 0 287 692 | | 10/1988 |
| EP | 0 528 526 | | 2/1993 |
| GB | 613 512 | | 11/1948 |
| GB | 952 029 | | 4/1964 |
| JP | 2003034296 A | * | 2/2003 |
| JP | 2003071942 A | * | 3/2003 |
| JP | 2005153680 A | * | 6/2005 |
| WO | WO 02/28709 | | 4/2002 |
| WO | WO 2005/115840 | | 12/2005 |
| WO | WO 2008/109217 | | 9/2008 |
| WO | WO 2010/110964 | | 9/2010 |
| WO | WO 2011080286 A2 | * | 7/2011 ............ B64C 1/061 |
| WO | WO 2012/028263 | | 3/2012 |

OTHER PUBLICATIONS

International Search Report for Application No. PCT/US2008/052941 dated Jul. 3, 2008.
International Search Report for Application No. PCT/EP2011/004144 dated Jan. 9, 2012.
European Search Report for Application No. EP 13 18 2096 dated Jan. 27, 2014.

* cited by examiner

WINDOW PANEL FOR AN AIRFRAME AND METHOD OF PRODUCING SAME

CROSS-REFERENCE TO RELATED APPLICATION

This application claims the benefit of and priority to the European Patent Application No. EP 13 182 096.1, filed Aug. 28, 2013, the entire disclosure of which is herein incorporated by reference.

TECHNICAL FIELD

This disclosure relates to a window panel, especially a window panel for a body structure of a vehicle, such as an airframe of an aircraft or spacecraft, and to a method of producing such a window panel.

In other words, the window panel and method of the disclosure are especially suitable for use in an airframe or fuselage of an aircraft or spacecraft, and it will be convenient to describe the disclosure in this exemplary context. However, it will be appreciated that the window panel and method of the disclosure are not limited to this application, but may be used to provide panels for the body structure of a variety of other vehicles, such as trains, automobiles, trucks or ships. Thus, the disclosure may be suitable for a range of nautical, aeronautical, automotive and aerospace applications.

BACKGROUND

The use of composite materials, especially fiber-reinforced polymer composites, in the design and manufacture of aircraft and spacecraft today is becoming increasingly prevalent due to the light-weight and relatively high-strength properties achievable with those materials. Nevertheless, the current production and assembly techniques employing fiber-reinforced polymer composites, e.g. (CFRP), in aircraft manufacture are not without their drawbacks, including substantial production and assembly effort and time delays.

SUMMARY

It is therefore an idea of this disclosure to provide a new and improved window panel, and a method of producing same, with which composite materials, e.g. fiber-reinforced polymer (FRP) composites, may be employed to take advantage of their physical and mechanical properties. It is a further idea of the disclosure to provide a new and improved window panel, and a method of producing same, which address one or more of the drawbacks of the prior art, e.g. to reduce production delays and/or to provide a simplified assembly procedure.

According to one aspect, therefore, the disclosure provides an aperture panel for a body structure of a vehicle, especially for an airframe of an aircraft or spacecraft, comprising:
- a first skin extending over a first side of the panel to form an outer skin of the vehicle body structure;
- a second skin extending over a second side of the panel to form an inner skin of the vehicle body structure; and
- a core, especially a foam core, which is located between and covered by the first and second skins to form a sandwich structure;
- wherein at least one aperture is provided in or through the first layer, the core, and the second layer. The at least one aperture is typically a window aperture.

In this regard, it will be understood by persons skilled in the art that the first and the second "skin" of the panel are or form layers, e.g. outer layers, of the sandwich structure. It will also be understood by persons skilled in the art that although the aperture panel of the disclosure is typically a window panel and will hereinafter be described as such, the concept of the disclosure is not limited to a window panel per se, but may include a door panel or a hatch panel, which may then include at least one door aperture or at least one hatch aperture, respectively. In other words, the present disclosure is not limited by the function of the aperture formed through the sandwich structure of the panel as being for a window, when an aperture of a roughly similar size may fulfil another function.

In an embodiment, the first skin comprises a fiber-reinforced composite, such as fiber-reinforced polymer (FRP) composite or fiber-reinforced metal composite (e.g. a fiber-reinforced aluminium known under the trade name Glare™). In a similar manner, the second skin may also comprise a fiber-reinforced composite, such as fiber-reinforced polymer (FRP) composite or a fiber-reinforced metal composite, like Glare™. For a first skin and/or a second skin comprised of a fiber-reinforced polymer (FRP), the fibers will typically be selected from the group of glass, carbon, and aramid fibers. The polymer resin material that is infused into the layer(s) of reinforcement fibers is typically selected from the group consisting of epoxy, polyester, vinyl ester and nylon resins. It will be appreciated, however, that the disclosure is not limited to the first and second skins being formed of fiber-reinforced composites. Rather, it is contemplated that the first and second skins may be comprised of a metal or alloy layer, such as an aluminium alloy.

In a further embodiment, the core of the window panel is comprised of a relatively low density material, like a foam (e.g. a hard or solid foam). Optionally, the foam of the core has a closed-cell structure, especially when the first skin and/or the second skin that cover the core comprise an FRP. Synthetic foams, like polyvinylchloride (PVC), polyurethane (PU), polyethylene (PE) or polystyrene foams, as well as syntactic foams or metallic foams may be contemplated as a material of the panel core. It may be possible to provide a polymethacrylimide (PMI) foam as a closed-cell rigid foam plastic.

By providing a window panel that has a sandwich structure according to the disclosure, and desirably employing composite materials, a new approach in the design and manufacture of an airframe or fuselage structure is possible exhibiting reduced assembly and shimming effort. In particular, the window panel of the disclosure enables a highly integrated or multi-functional panel construction; e.g. optionally incorporating or replacing conventional insulation sheeting and/or enabling system integration, for example, via conduit or cable routing through the panel core.

Accordingly, the sandwich-structured composite window panel is usually fabricated with first and second FRP skins, which form two thin but relatively stiff layers over a lightweight but relatively thick core. The core material may be a lower strength material than the first and second skins, but its higher thickness provides the sandwich structure with a high bending stiffness and yet with an overall relatively low density. Because the first FRP skin extending over the first side of the window panel may be configured to define or form an aerodynamic skin of the vehicle, the first side of the panel will generally be understood as being or representing an external side of the panel. Thus, the second side of the window panel will similarly be generally understood as being or representing an internal side of the panel. It may be nevertheless be possible to contemplate alternatives to this general configuration.

In a further embodiment of the disclosure, a plurality of window apertures are provided in the panel arranged spaced apart and laterally adjacent or next to one another along a length of the panel. Thus, each of the window apertures is provided in and extends through the first skin, the core, and the second skin. Therefore, in this embodiment the window panel is typically provided as an elongate panel, known in the field as a window "belt", with multiple window apertures arranged side-by-side along the length of the panel or belt between a first (e.g. upper) edge region and a second (e.g. lower) edge region of the panel. The elongate window panel or "belt" may be generally rectangular and the window apertures may be substantially aligned with one another.

In a further embodiment, the core of the panel is confined to or extends over a limited extent, region or part of an area of the panel. In a further embodiment of the disclosure, for example, the core is elongate and confined to extend in a central region of the panel. The first skin and/or the second skin extend over or cover a greater area of the panel than the core, i.e. typically the entire area of the panel. In this way, the first skin and/or the second skin of the panel either individually or in combination form a monolithic panel structure in a region of the panel beyond an extent of the core. Thus, the core may be confined to extend in a central region of the panel between a monolithic first edge region and a monolithic second edge region of the panel. Each window aperture in the panel is surrounded by the core in the sandwich structure.

In a further embodiment, the core may have a substantially constant thickness over its extent or expanse in the window panel. In an alternative embodiment, a thickness of the core (i.e. through the panel) decreases from a maximum in a central region of the panel towards each of a first (upper) edge region and a second (lower) edge region of the panel. Thus, the window panel may have a "lenticular" shape or form (i.e. a lens shape) in cross-section, the benefits of which are described in published International Patent Application WO 2012/028263 A1, the entire contents of which are incorporated herein by reference. In either embodiment, i.e. regardless whether the core has a substantially constant thickness or tapers in a lenticular cross-section, the first and second skins of the panel are preferably joined or bonded to one another at and/or along the first (upper) edge region and the second (lower) edge region of the panel. That is, the first skin and the second skin are preferably bonded or joined to one another at or along each of the opposite edge regions to form the monolithic structure referred to above.

In a further embodiment, the first skin and the second skin are joined or bonded to each other to form a monolithic region at or around a periphery of each window aperture. Optionally, a reinforcement insert may be included between the first and second outer layers at or around the periphery of each window aperture. This monolithic region at or around the periphery of each window aperture forms an attachment region at which a window assembly may be fixed or mounted in the window panel, for example at or from an inner side of the panel. To this end, the window assembly may include at least one pane to cover the window aperture and a mount or seal around the pane(s). The mount or seal desirably seals between the at least one pane of the window assembly and the monolithic attachment region at the periphery of the window aperture. The window assembly may further comprise a retainer element configured to engage an outer periphery of the mount or seal and the at least one pane at an inner side of the panel. That is, the retainer element may substantially surround the window assembly at the inner side of the panel and desirably substantially cover the attachment region.

In a further embodiment, the core may include one or more support elements embedded therein, with each support element preferably extending transversely across the core between the first skin and the second skin. In this regard, the one or more support elements may include an elongate stiffener or strut, e.g. with an I-shaped, Z-shaped, C-shaped or T-shaped cross-sectional profile, or combination thereof, that extends essentially parallel to a plane of the first and/or second skin of the window panel. Alternatively, the one or more support elements may include pins, which may be inserted to extend substantially perpendicular to, or at an acute angle to, the first and/or second side of the window panel. Further, the one or more support elements may include a block insert of higher density (e.g. of higher density foam) arranged within the core.

In a further embodiment, the window panel includes at least one elongate structural element, and desirably a plurality of elongate structural elements, connected at the second side of the panel and extending over the panel substantially parallel to the second skin. In this way, i.e. with the addition of elongate structural elements, the window panel may be further developed to form a structural shell that constitutes part of the vehicle body structure or airframe. Each said structural element desirably has a cross-section or profile transverse to its longitudinal axis that is I-shaped, T-shaped, L-shaped C-shaped, or Z-shaped, or a combination thereof, such that a flange of its profile is arranged parallel to the second layer at the second side of the panel. In this regard, each structural element may be connected with a support element in the core of the panel at an interface. In one example, the elongate structural element is connected with a support element at an interface generally parallel to the second skin. In another example, the elongate structural element is connected with a support element at an interface that is substantially perpendicular to the second skin; e.g. the support element may project through or beyond the second outer layer to the second side of the panel for connection to a web in the profile of the structural element.

With the panel of the disclosure, a significantly simpler and faster mounting of window assemblies is able to be realised. In particular, no rigid window frame members with complicated and time-consuming riveting procedures are required. Instead, the sandwich structure of the panel in the central region and the monolithic rim or periphery of each window aperture provides the rigidity and stability required, and enable each window assembly to be reduced to just the panes, a seal, and a retainer element. As such, each window assembly may mounted and fixed with just few bolts, leading to a substantial time saving and major simplification. The foam core of the window panel may also enable a reduction in, and possibly even an elimination of, thermal insulation that previously needed to be added in an aircraft fuselage in the window area. This, in turn, may create more cabin space in the aircraft (e.g. more shoulder space for a passenger) as well as a saving in aircraft mass. The inner side of each panel may be configured for attachment of a decorative foil, sheet, or covering to simplify the interior lining or cladding (e.g. sidewall lining) of an aircraft fuselage.

In view of the above description of the window panel of the disclosure, it will be appreciated that the present disclosure contemplates a variety of different production methods and techniques for producing such a window panel. For example, a material of the first skin and/or the second skin will have a significant influence on the production method, as will the material of the core. In a particularly preferred production method of the disclosure, the first skin and the second skin are both comprised of a fiber-reinforced polymer and the core is comprised of a synthetic foam material, such as PMI.

According to an embodiment, therefore, the disclosure provides a method of producing a window panel for a body structure of a vehicle, such as an airframe of an aircraft or spacecraft, the method comprising:
providing an expanse of a core material, such as a foam, and forming at least one aperture therein;
providing one or more reinforcement fiber layers over a first side of the core material;
providing one or more reinforcement fiber layers over a second side of the core material;
wherein the reinforcement fiber layers are impregnated with a polymer resin; and
curing the polymer resin impregnated reinforcement fiber layers on the first and second sides of the core material to form a first skin and a second skin of fiber-reinforced polymer which cover the core in a sandwich structure;
wherein the first skin and the second skin extend beyond the expanse of the core material.

In a further embodiment, the one or more reinforcement fiber layers provided over the first side and the second side of the core material include a fabric of reinforcement fibers such as glass fibers, carbon fibers or aramid fibers. The fabric of reinforcement fiber may be a woven or non-woven fabric (e.g. NCF). One or more layers of that fabric may be provided on or covering the core in a dry state (i.e. without polymer resin) and then subsequently impregnated with resin, or alternatively, may be pre-impregnated with resin and then provided on or covering the core as a "prepreg". In each case, the resin impregnated reinforcement fibers covering the core are cured or co-cured to form the sandwich structure.

In a further embodiment of the disclosure, the method comprises: forming a monolithic portion of the panel from the resin impregnated reinforcement fiber layers in a region of the panel beyond the expanse of the core material. This may, for example, include joining or bonding the resin impregnated reinforcement fiber layers on opposite sides of the core to each other at or along a first edge region and/or a second edge region of the panel.

In a further embodiment of the disclosure, the one or more reinforcement fiber layers over the first side of the expanse of core material is provided with a respective aperture in alignment with each said at least one window aperture formed in the expanse of core material. Similarly, the one or more reinforcement fiber layers over the second side of the core material is formed or provided with a respective aperture in alignment with each said at least one window aperture formed in the expanse of core material.

In a further embodiment, the expanse of core material is elongate and has a plurality of window apertures formed therein arranged at intervals and laterally adjacent or next to one another along a length thereof. Furthermore, the resin impregnated reinforcement fiber layers of the first side may be joined or bonded to the resin impregnated reinforcement fiber layers of the second side at or around a periphery of each window aperture to form a monolithic region for mounting or attachment of a window assembly.

In a further embodiment, the method further includes mounting a window assembly in each said at least one window aperture by fixing the window assembly to or at the monolithic region at or around the periphery of the window aperture. The mounting of each window assembly may be performed at or from an inner (second) side of the panel. The method of the disclosure may optionally include inserting a reinforcing patch into an interface portion between first and second side layers of resin impregnated reinforcement fibers which form the monolithic region at or around the periphery of each window aperture.

In a further embodiment, the steps of providing the one or more fiber reinforcement layers over the first side and over the second side of the core material includes arranging said one or more fiber reinforcement layers adjacent the core to form one or more outer layers covering the core. This may, for example, be performed using a moulding tool, within which the core material is laid-up with fiber reinforcement layers. In this regard, the core is preferably comprised of a solid foam or hard foam, especially a closed-cell foam. The step of laying-up the fiber reinforcement layers in the moulding tool usually takes place at a lay-up station and typically at room temperature, as it is usually performed by hand before the moulding tool is moved or transferred to an infusion station at which the step of impregnating the layers of reinforcement fibers with polymer resin is performed.

In a further embodiment, the step of impregnating the fiber reinforcement layers includes resin infusion techniques such as vacuum bagging, resin transfer moulding (RTM), or vacuum-assisted resin transfer moulding (VARTM), with which polymer resin may be infused into the moulding tool. The method of the disclosure may take particular care to essentially avoid residual stresses forming in the composite sandwich structure. This is especially important in composite panels having a foam core sandwich structure because, whereas a hard foam core will tend to contract in the cooling phase after curing, cured FRP skins will usually have a lower coefficient of thermal expansion and will be largely unaffected by the cooling, which can otherwise lead to residual stresses.

In a further embodiment of the disclosure, the method further includes limiting or substantially preventing a change in volume of the panel, and particularly of the foam core, during an impregnating step and/or during curing and cooling. In this way, any expansion of the foam core in the sandwich structure can be substantially prevented or at least limited during production of the panel, which in turn can minimise generation of residual stresses in the foam core due to its different coefficient of thermal expansion compared to the CTE of the FRP skins. The step of limiting or substantially preventing a change in volume of the panel, and especially the core, may be achieved by applying pressure to the semi-finished panel (e.g. in the moulding tool) to hold the core in a compressed state against its thermal expansion. In this regard, the moulding tool may comprise at least two mould parts with a mould cavity or space for accommodating the reinforcement fiber layers and the foam core (i.e. the semi-finished panel) prior to infusion with the resin. The mould parts may thus be configured to hold or to clamp the semi-finished panel against its thermal expansion when the moulding tool is closed.

In a further embodiment, the method includes inserting or embedding one or more support element into the core material, whereby the support element preferably extends transversely across the core between the first side and the second side. The one or more support element is inserted or embedded into the core material typically before or during the lay-up procedure, during which the reinforcement fiber layers are applied to cover the first and second sides of the core. As noted above, the one or more support element may include an elongate rib or stiffener, e.g. having I-shaped or T-shaped cross-sectional profile, which is inserted to extend essentially parallel to a plane or the first and/or second side of the core. As an alternative, the support elements may include pins, which may be inserted approx. perpendicular or at an angle to the first or second side of the panel. Also, the support elements may include block inserts of higher density (e.g. of higher density foam) within the foam core.

In a further embodiment, the method includes connecting elongate structural elements at the second (i.e. internal) side of the panel, with the structural elements extending substantially parallel to the second layer. In this way, the elongate structural elements may be configured to constitute part of the vehicle body or airframe structure. The structural elements are preferably connected to the panel directly adjacent a respective support element within the core.

According to another aspect, the present disclosure provides a window panel produced by a method according to any one of the embodiments described above, especially for use in an airframe structure of an aircraft or spacecraft.

According to a further aspect, the present disclosure provides a vehicle, such as an aircraft or spacecraft, having a body or airframe structure that includes one or more window panel according to any of the embodiments described above.

BRIEF DESCRIPTION OF THE DRAWINGS

For a more complete understanding of this disclosure and the advantages thereof, exemplary embodiments of the disclosure are explained in more detail in the following description with reference to the accompanying drawings, in which like reference characters designate like parts and in which.

The accompanying drawings are included to provide a further understanding of the present disclosure and are incorporated in and constitute a part of this specification. The drawings illustrate particular embodiments of the disclosure and together with the description serve to explain the principles of the disclosure. Other embodiments of the disclosure and many of the attendant advantages of the disclosure will be readily appreciated as they become better understood with reference to the following detailed description.

DETAILED DESCRIPTION

It will be appreciated that common and well understood elements that may be useful or necessary in a commercially feasible embodiment are not necessarily depicted in order to facilitate a more abstracted view of the embodiments. The elements of the drawings are not necessarily illustrated to scale relative to each other. It will further be appreciated that certain actions and/or steps in an embodiment of a method may be described or depicted in a particular order of occurrences while those skilled in the art will understand that such specificity with respect to sequence is not necessarily required. It will also be understood that the terms and expressions used in the present specification have the ordinary meaning as is accorded to such terms and expressions with respect to their corresponding respective areas of inquiry and study, except where specific meanings have otherwise been set forth herein.

Figure 1:
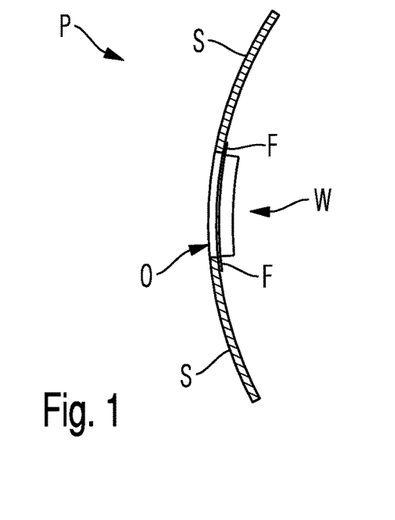
FIG. 1 is a cross-sectional side view of an exemplary window panel for an airframe of an aircraft.

Referring firstly to FIG. 1 of the drawings, an exemplary window panel P of an airframe is shown incorporating a window assembly W which is fixed in a window aperture O provided in the panel P. According to this construction technique, the window assembly W includes a metal frame F (e.g. of aluminium) having a T-shaped cross-sectional profile for stiffening and reinforcing the skin of the panel P at the window aperture O against buckling or deformation. The metal window frame F is fixed to the curved sheet or skin S of the panel P using a large number of rivets (e.g. 60 to 80 rivets per window frame) in an extensive riveting operation. As a result, the sheet or skin S of the window panel P is formed relatively thick (e.g. approx. 5 mm) to provide the necessary mechanical strength. Thus, the window frame panel or window "belt" P for an airframe or aircraft fuselage structure is both material-intensive and labour-intensive in the production and the installation of the individual window assemblies.

Figure 2:
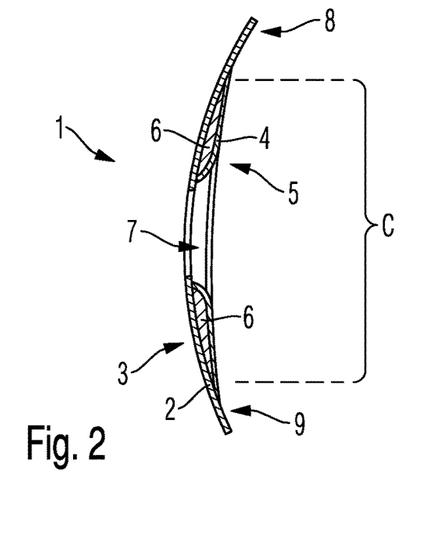
FIG. 2 is a cross-sectional side view of a window panel for an airframe of an aircraft according to an embodiment of the disclosure.
Figure 3:
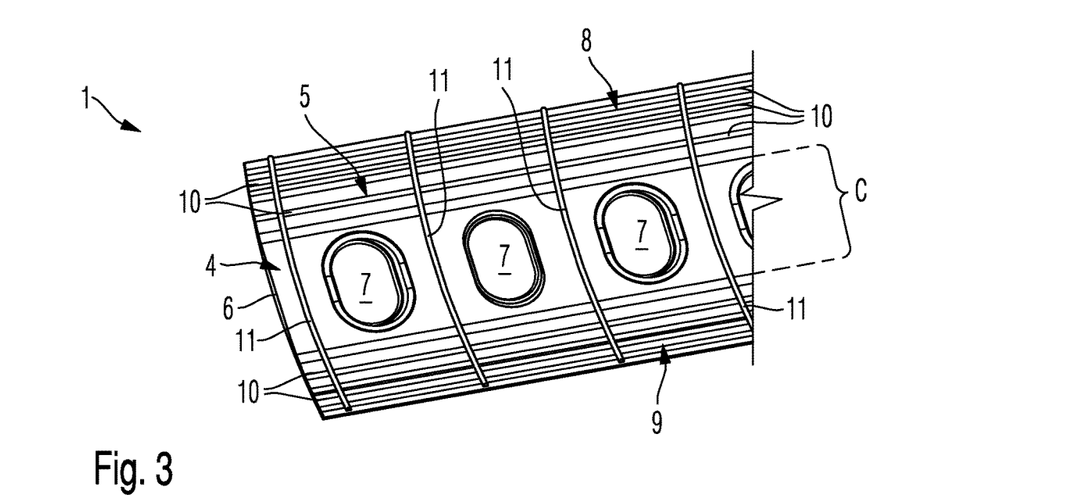
FIG. 3 is a perspective inner-side view of a window panel for an airframe of an aircraft or spacecraft according to another embodiment of the disclosure.
Figure 4:
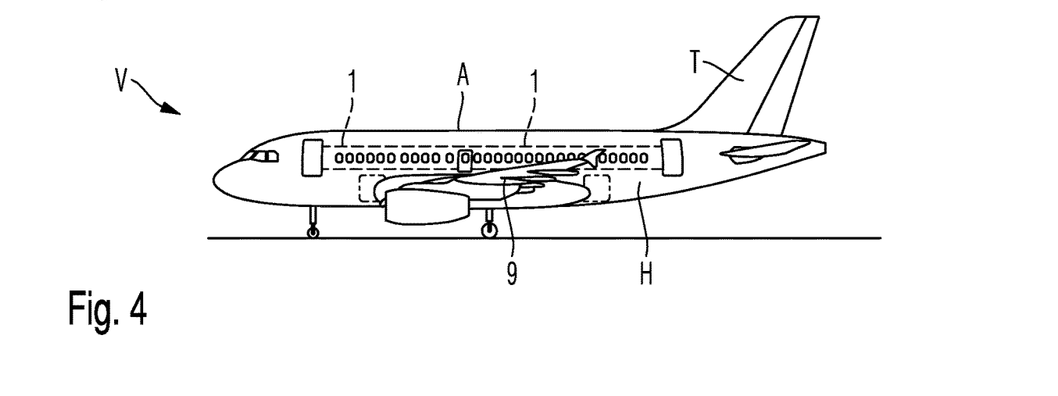
FIG. 4 is a schematic illustration of an aircraft in which window panels according to another embodiment of the disclosure are incorporated or installed.

With reference now to FIGS. 2 to 4 of the drawings, a window panel 1 according to a preferred embodiment of the disclosure is illustrated in the form of a window "belt" for an airframe or fuselage of an aircraft. In FIG. 3, for example, the elongate or "belt"-like nature of the panel 1 is particularly apparent. Also, the broken lines in FIG. 4 indicate how such an elongate window panel 1 may be incorporated in the fuselage structure of an aircraft V. That is, FIG. 4 shows a schematic illustration of an aircraft V having an airframe A, including wings G, a fuselage H, and a tail T, in which one or more window panels 1 according to an embodiment of the disclosure is/are installed or incorporated.

In this embodiment the window panel 1 includes a first skin 2 of fiber-reinforced polymer that extends over a first side 3 (i.e. an external side) of the panel 1 to define or form part of an aerodynamic skin of airframe A. Furthermore, the window panel 1 includes a second skin 4 of fiber-reinforced polymer which extends over a second side 5 (i.e. an internal side) of the panel 1, and a core 6 in a central region C of the panel comprised of a solid, closed-cell PMI foam, which is located between and covered by the first and second FRP skins 2, 4 to provide a sandwich structure. The window panel 1 includes a series of window apertures 7 which extend through the first and second skins 2, 4 and the core 6, and are arranged evenly spaced apart laterally adjacent one another in the central region C of the panel between a first upper edge region 8 and a second lower edge region 9. As the foam core 6 is confined to the central region C of the window panel 1, the first and second skins 2, 4 at opposite sides 3, 5 of the panel come together at the upper edge region 8 and the second lower edge region 9—i.e. where the core 6, and thus central region C, terminate—to form monolithic FRP edge regions 8, 9.

Referring to FIG. 3, the window panel 1 can be seen to include a number of elongate structural elements 10 in the form of stringers which are connected to the internal side 5 of the panel 1 and extend longitudinally thereof in each of the upper and lower edge regions 8, 9, i.e. approx. parallel to a longitudinal axis of aircraft fuselage H. Furthermore, the window panel 1 includes elongate structural elements 11 provided in the form of ribs connected to the internal side 5 of the panel 1 and extending generally perpendicular to the stringers 10 between each pair of adjacent window apertures 7. The stringers 10 and the ribs 11 may, for example, have a profile in transverse cross-section that is I-, T-, C- or Z-shaped, or a combination thereof.

Figure 5:
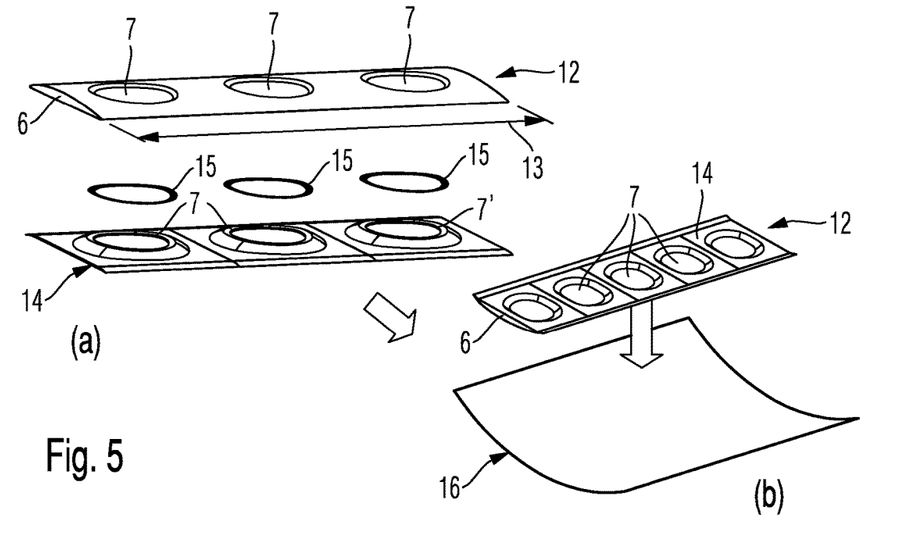
FIG. 5 is a perspective illustration in views (a) and (b) of stages of a method of producing a window panel according to another embodiment of the disclosure.

Referring to FIG. 5 of the drawings, a method of producing a window panel 1 according to a preferred embodiment is illustrated schematically in views (a) and (b). Specifically, an elongate strip or expanse 12 of core material comprising a suitable closed-cell foam, such as PMI foam, is provided with a series of window apertures 7 machined therein spaced apart at intervals along a length 13 of that strip. A number of layers of reinforcement fibers, typically provided as one or more woven or non-woven fabric sheets 14 (such as non-crimp fabric (NCF) sheets) of e.g. carbon fibers, are provided for covering an internal side 5 of the strip 12 of core material. Also, additional reinforcement inserts 15 in the form of ring shaped patches may be included between the layers or fabric sheets 14 of reinforcement fibers and the strip 12 of core material 6 for strengthening a region of the panel around a periphery of each window aperture 7 in the core material 6. It will be noted here that the layers of reinforcement fibers in the sheets 14 covering the inner side 5 of core material 6 also incorporate window apertures 7' which are positioned for alignment with the respective window apertures 7 in the core material.

After applying the reinforcement fiber layers 14 on a second side or internal side 5 of the strip 12 of core material 6, layers of reinforcement fibers in the form of one or more woven or non-woven fabric sheets 16 (such as non-crimp fabric (NCF) sheets) e.g. of carbon fibers, are provided over the external side 3 of the core material 6, as seen in FIG. 5(b). The fabric sheets 16 forming reinforcement fiber layers at the first side 3 of the window panel 1 may be provided with a curvature in a moulding tool (not shown) to correspond with or produce the desired curvature in the skin of an airframe A or fuselage structure. Although not shown in FIG. 5(b), the reinforcement layers 16 at the exterior side 3 of the core material also typically include a corresponding plurality of window apertures 7" for alignment with the respective window apertures 7 formed in the core 6.

Once the NCF sheets 14, 16 of reinforcement fibers cover both the external and internal sides 3, 5 of the core material 6, these fiber layers 14, 16 are impregnated or infused with a polymer resin within the moulding tool. On curing, the resin consolidates and hardens to form first and second skins 2, 4 of CFRP bonded in a sandwich structure with the core 6 in a central region C and with each other in monolithic upper and lower edge regions 8, 9 to thereby produce a window panel 1. For later reference, it will be noted that the first (outer) and second (inner) CFRP skins 2, 4 also interface and bond with one another at a periphery 17 of each window aperture 7 formed or provided in the core 6 of the window panel 1 to form a monolithic region, optionally including reinforcement insert 15 as shown in FIG. 5(a).

Figure 6:
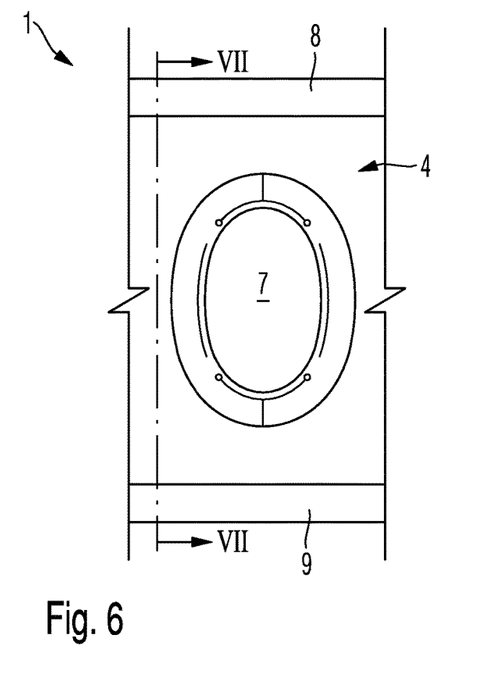
FIG. 6 is a front view of a window panel according to an embodiment of the disclosure.
Figure 7:
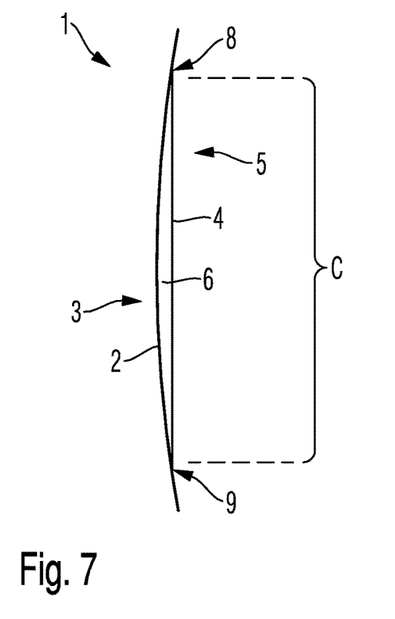
FIG. 7 is a cross-sectional side view of a window panel according to an embodiment of the disclosure.

FIG. 6 illustrates a portion of the window panel 1 formed according to the method of this embodiment and FIG. 7 shows the panel 1 in cross-section in a direction of arrows VII-VII in FIG. 6. In this view, it is particularly apparent that the core 6 of the sandwich structure in this embodiment is not of constant or uniform thickness, but rather has a lenticular or lens shape in cross-section. The thickness of the core 6 is thus at a maximum in the central region C of the panel 1 and decreases or tapers to a minimum towards each of the upper and lower edge regions 8, 9 at which a vertical extent of the core 6 ends or terminates. Indeed, the first and second CFRP skins 2, 4 run together in the upper and lower edge regions 8, 9 of the panel to form monolithic CFRP edge regions. The lenticular or lens shape of the window panel 1, the benefits of which are described in WO 2012/028263 A1, is particularly apparent from the cross-section of FIG. 7.

Figure 8:
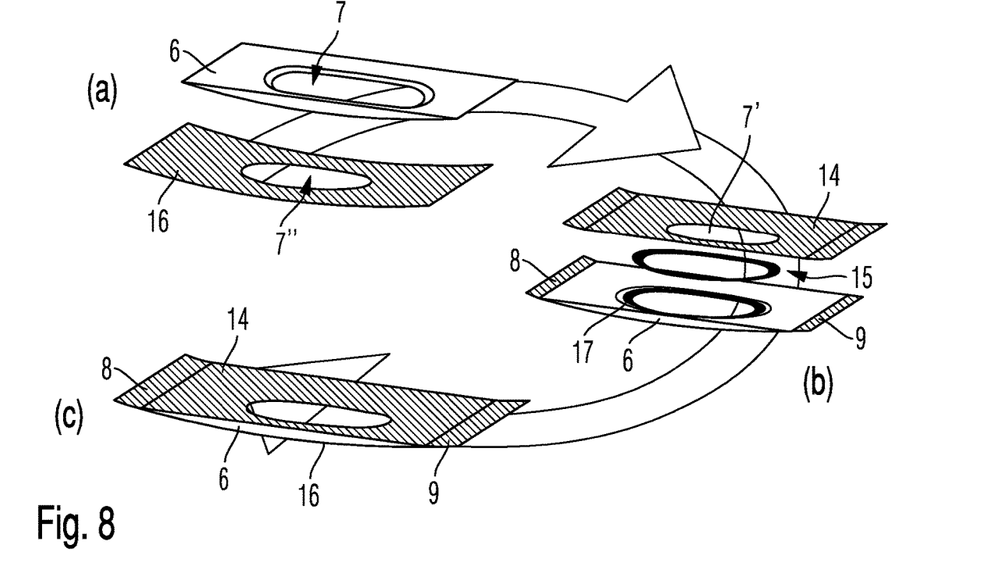
FIG. 8 is a perspective illustration in views (a) to (c) of stages for a method of producing a window panel according to a further embodiment.

With reference now to drawing FIG. 8, a method of forming a window panel 1 according to a further embodiment is shown schematically in views (a) to (c). In this embodiment, the method is illustrated in a simplified way by representing the panel 1 with only a single window aperture 7. It will be appreciated, however, that the method illustrated is equally applicable to larger panels, e.g. formed as a window "belt" comprising an elongate strip 12 of core material 6 as seen in FIG. 5. In this embodiment, although the moulding tool itself is not shown, layers of reinforcement fibers (e.g. carbon) in one or more woven or non-woven fabric sheets 16 are laid-up in a moulding tool providing a desired outer curvature of a fuselage or airframe structure to form a first skin 2 that defines an aerodynamic skin of an airframe. A correspondingly shaped core layer 6, 12 of a hard PMI foam material is then arranged or placed into the moulding tool in contact with the first outer layers 16 of reinforcement fibers. The foam core material 6 again has a lens-shaped cross-section (as above) being curved on the first or external side 3 to conform with the curvature of the moulding tool, and being somewhat more flat (or even substantially flat) on the second or internal side 5. Thus, the core material 6 again tapers in thickness towards the first and second edge regions 8, 9 and terminates toward these edge regions 8, 9 within a breadth or height of the fiber layers or sheets 16 at the first side 3.

A window aperture 7" in the layers 16 of reinforcement fibers is somewhat smaller than a window aperture 7 in the material of the core 6 and is aligned therewith to create a rim or periphery of reinforcement fibers for producing a monolithic attachment portion 18 for a window assembly, to be described later. As seen in FIG. 8(b), optional reinforcement patch 15 is again placed in the periphery 17 of the window aperture 7 in the core material, then further layers 14 of reinforcement fibers (again provided as fabric sheets) are applied or laid-up over the internal side 5 of the core material 6. These reinforcement fiber layers 14 at the internal side 5 also include a window aperture 7' which is aligned with the window aperture 7 in the core material 6. As with the outer fiber layers 16, this aperture 7' is somewhat smaller to create a rim or periphery 17 of reinforcement fibers for producing the monolithic attachment region 18 (described in detail below). This method results in a configuration as shown in FIG. 8(c) in the moulding tool. The moulding tool is then closed and sealed and, upon application of a vacuum (e.g. in a VARTM procedure), is infused with polymer resin to impregnate the layers 14, 16 of reinforcement fibers covering the core 6. The resin impregnated fiber layers are then cured, bonding them both to the core 6 and to each other to form the window panel 1 of this preferred embodiment.

Figure 9:
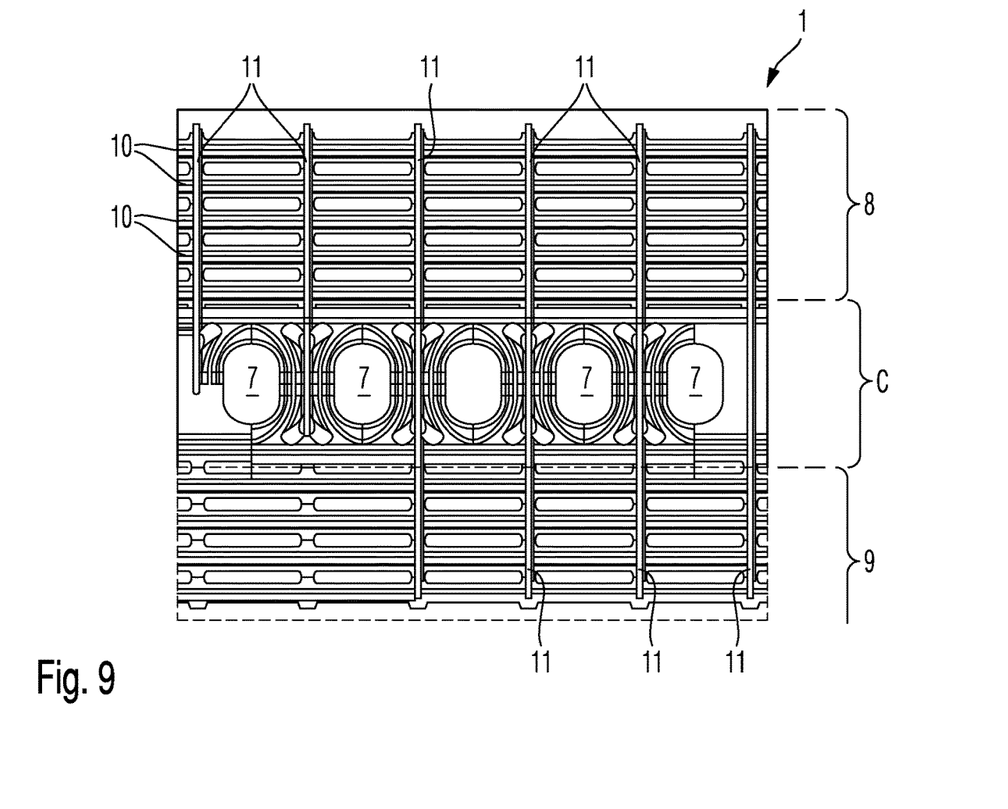
FIG. 9 is an inner-side view of a window panel according to an embodiment shown integrated in an airframe of an aircraft.

FIG. 9 illustrates a window panel or window belt 1 according to a preferred embodiment viewed from an inner or internal side 5 for integration in a shell section of an airframe A of an aircraft V. In this embodiment, the window panel or window belt 1 is broader in the monolithic edge regions 8, 9 above and below the sandwich structure of the central region C with the window apertures 7. The window belt 1 of this embodiment also includes stringers and ribs 10, 11 provided on the inner side 5 as structural elements. To ensure that the ribs 11 seat properly against a contour of the inner side 5 of the panel 1, a transition area from each of the edge regions 8, 9 to the central region C may include a support profile forming a base or seat for the ribs 11.

Figure 10:
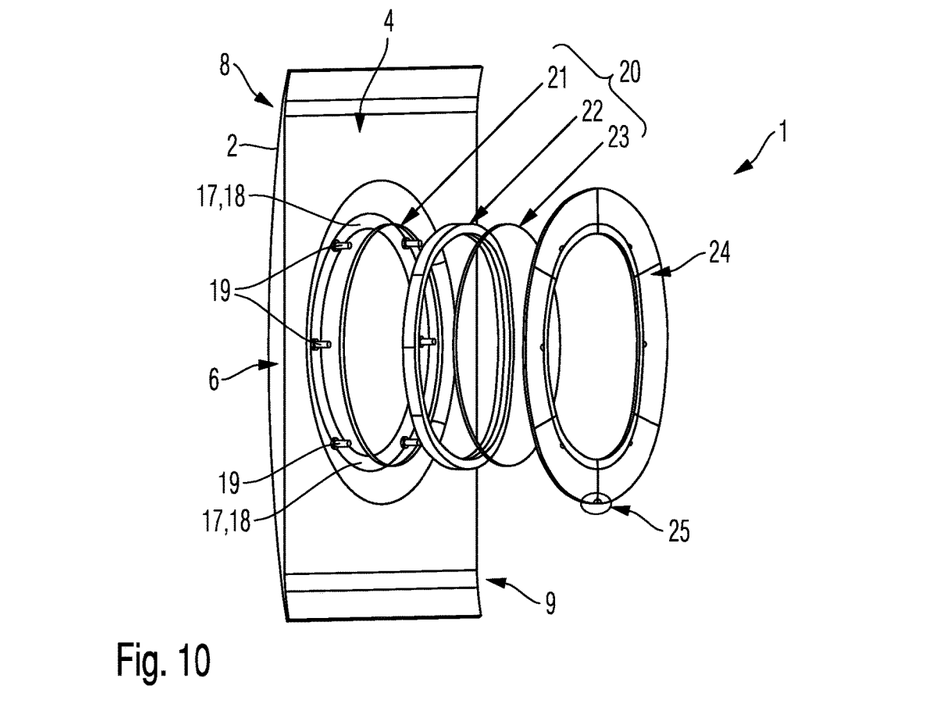
FIG. 10 is a partially exploded view of a window panel according to another embodiment.
Figure 11:
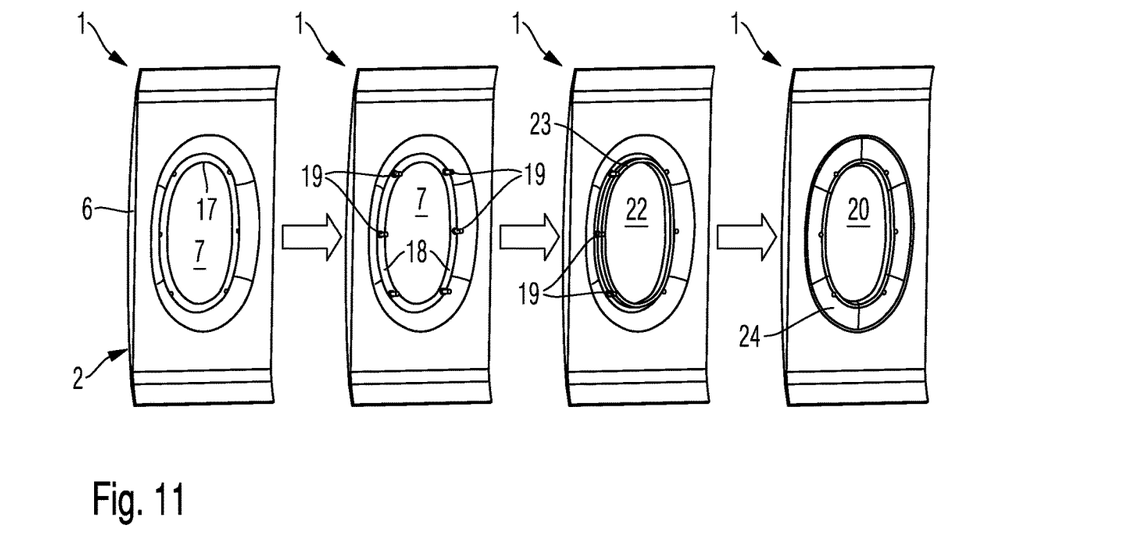
FIG. 11 is a series of perspective views illustrating the mounting of a window assembly in a window panel according to the embodiment of FIG. 10.

With reference now to FIGS. 10 and 11 of the drawings, the mounting of a window assembly 20 in a window panel 1 of the disclosure will be described. The particular embodiment of the window panel 1 in FIGS. 10 and 11 essentially corresponds to a panel produced by a method as described in connection with FIG. 5 or FIG. 8. The window assembly 20 comprises an outer pane 21 and an inner pane 22, both of which are typically comprised of a transparent polymer material, such as plexi-glass, although glass or a transparent ceramic may also be contemplated. The inner and outer panes 21, 22 are mounted and held within an oval-shaped flexible seal 23, which is mounted in the window aperture as shown in the exploded view of FIG. 10 and also represented by the sequence of images in FIG. 11. Fastening elements 19 in the form of bolts (e.g. stud bolts) may be fixed or secured to the panel 1 in the attachment region 18 around the periphery 17 of the window aperture 7 to secure and hold the window assembly 20. This attachment region 18 is a monolithic FRP region of the window panel 1 where the first FRP skin 2 and the second FRP skin 4 interface and are joined with one another directly, with the optional inclusion of one or more reinforcement insert 15. Accordingly, this region 18 of the panel 1 is particularly robust and, therefore, suitable for securely mounting the window assembly 20.

In this regard, the window seal 23 seals against the panel 1 under a clamping load applied via the stud bolts 19. To this end, a retainer element 24 formed as an oval- or ring-shaped plate is designed to be mounted and fixed on the bolts 19 and clamped over the window assembly 20. This retainer element 24 not only holds the window assembly 20 more securely in place at the window aperture 7, e.g. against the inflow of air in the event of a rapid decompression of the aircraft cabin in flight, but also covers the stud bolts 19 and the attachment region 18 of the panel to provide a clean finished appearance of the mounted window assembly 20. The retainer element 24 may optionally include a small air inlet/outlet 25 to provide pressure equalization.

Figure 12:
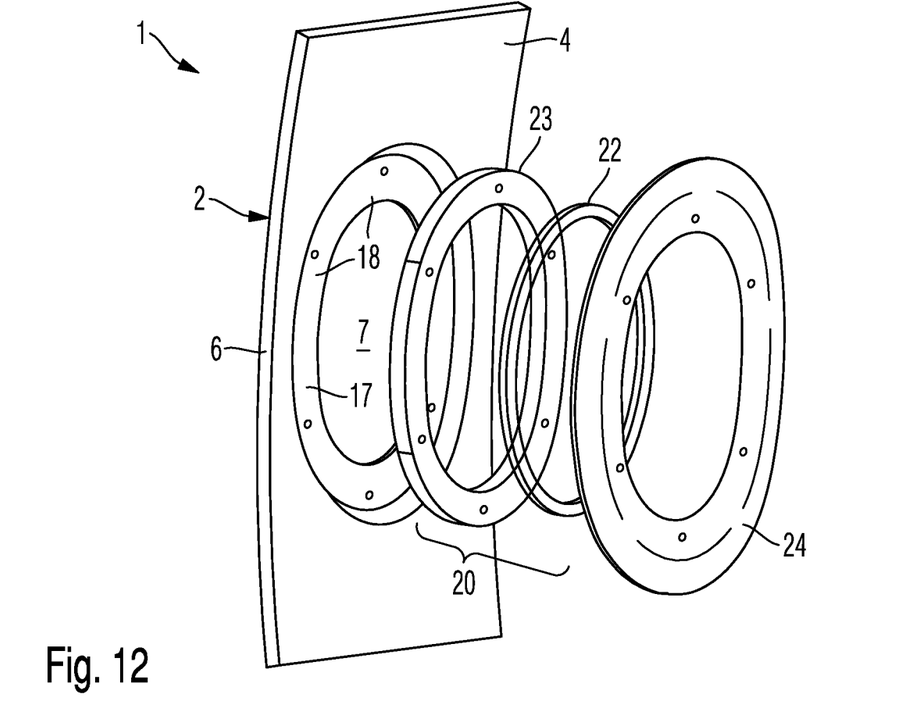
FIG. 12 is a partially exploded view of a window panel according to another preferred embodiment.
Figure 13:
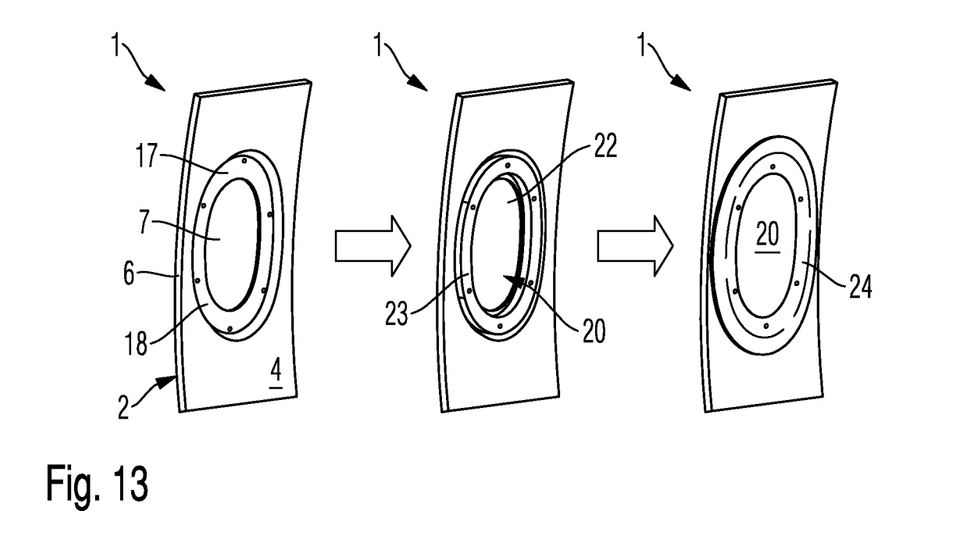
FIG. 13 is a series of perspective views illustrating mounting of a window assembly in a window panel according to the embodiment of FIG. 12.

Referring to FIGS. 12 and 13 of the drawings, an alternative preferred embodiment of a window panel 1 of the disclosure is shown together with the principle of installation of a window assembly 20. Again, this is illustrated both via an exploded view in FIG. 12, as well as a sequence of images in FIG. 13. In this embodiment, the core 6 of the sandwich construction has a substantially constant thickness over the expanse 12 of the core material and a width of the attachment region 18 at the periphery 17 of the window aperture 7 is slightly larger than in the previous embodiment. The construction of this window panel 1 remains essentially unchanged, however. In this embodiment, the window assembly 20 comprises a double pane 22 of greater thickness and is sealed and held within a flexible oval seal 23, which is again designed to be mounted in the attachment region 18 via fastening elements 19, such as stud bolts (not shown), as per the previous embodiment. Again also, a retainer element 24 formed as an oval- or ring-shaped plate is configured to be fixed on bolts 19 to provide additional security in mounting and retention of the window assembly 20 in the panel 1, but also to provide a neat finish and hide the attachment region 18 and bolts on which the window assembly is secured to the panel.

With the window panel 1 of the disclosure, a significantly simpler and faster mounting of window assemblies is able to be realised. In particular, no rigid window frame members F with their complicated and time consuming riveting procedures known from the prior art are required. The sandwich structure of the panel 1 in the central region C and the monolithic rim or periphery 18 in each window aperture 7 provides the stiff-ness required and enable the window assembly to be reduced to the panes 21, 22, the seal 23, and the retainer 24, which can be mounted and fixed by e.g. just six bolts 19, instead of 60-80 rivets. The foam core 6 of the window belt 1 may also enable a reduction, or possibly even elimination, of thermal insulation that may need to be added in an aircraft fuselage in this area. This, in turn, would lead to more cabin space in the aircraft (e.g. passenger shoulder space) and overall a lower aircraft mass. In addition, the inner side 5 of each panel 1 may be adapted for attachment of a décor foil, sheet, or covering to simplify the interior decorative cladding of the aircraft fuselage.

Figure 14:
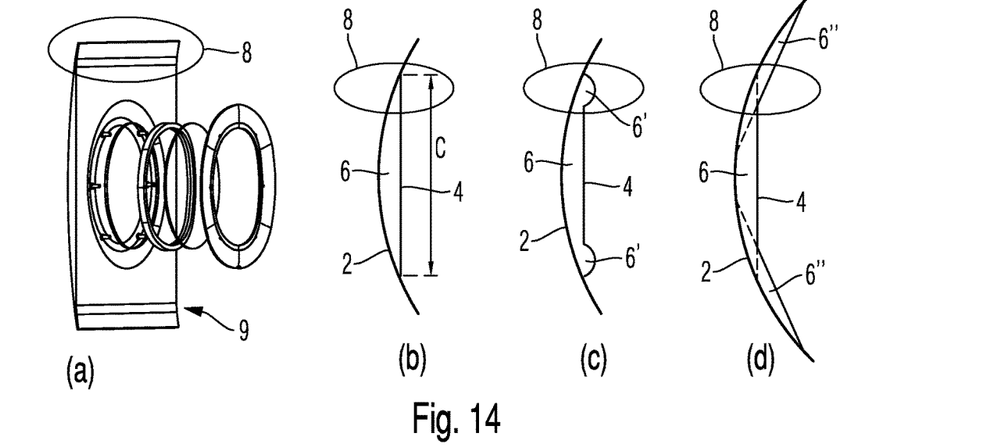
FIG. 14 is a series of views (a) to (d) illustrating three variations for the cross-section of a window panel according to the embodiment of FIG. 10.

FIG. 14 illustrates in view (a) the embodiment of FIG. 10 and schematically denotes in views (b), (c), and (d) variations in the design and/or construction of the monolithic FRP first (upper) edge region 8 and the monolithic FRP second (lower) edge region 9 of the panel 1. FIG. 14(b), for example, shows the basic lenticular core configuration described earlier. In FIG. 14(c), on the other hand, the core material 6 includes a longitudinally extending bulge or rib 6' in its transverse cross-sectional profile at each of the upper and lower edge regions 8, 9. The bulge or rib 6' has the effect of providing greater longitudinal stiffness in the window panel 1 without the attachment of stringers 10. In FIG. 14(d), additional or supplementary core elements 6" are added above and below the original lenticular core 6. In this way, the breadth of the central region C and thus an extent of the sandwich structure in the upper and lower directions can be increased without increasing the thickness of the lens-shaped core 6. The first and second skins 2, 4 of the panel 1 cover the additional or supplementary core elements 6" just as they do the core 6.

Figure 15:
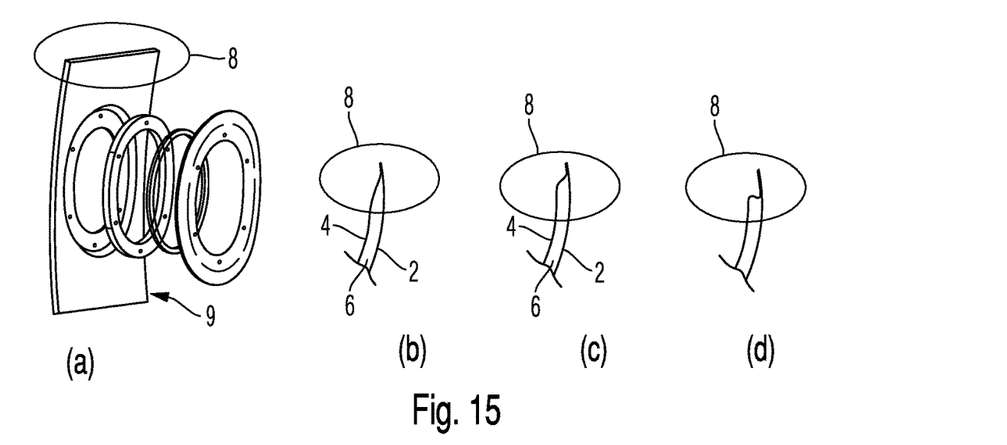
FIG. 15 is a series of views (a) to (d) illustrating three variations for the cross-section of a window panel according to the embodiment of FIG. 12.

In a similar manner, FIG. 15 shows in view (a) the embodiment of FIG. 12 and denotes in views (b), (c), and (d) variations in the way the monolithic FRP upper edge region 8 and lower edge region 9 may be constructed or formed. More specifically the views (b), (c), and (d) of FIG. 15 show variations in the shape of a transition of the inner and outer skins 2, 4 from the sandwich structure in the central region C of the panel 1 to the monolithic upper edge region 8 (or lower edge region 9) when material of the core 6 has a substantially constant thickness.

Figure 16:
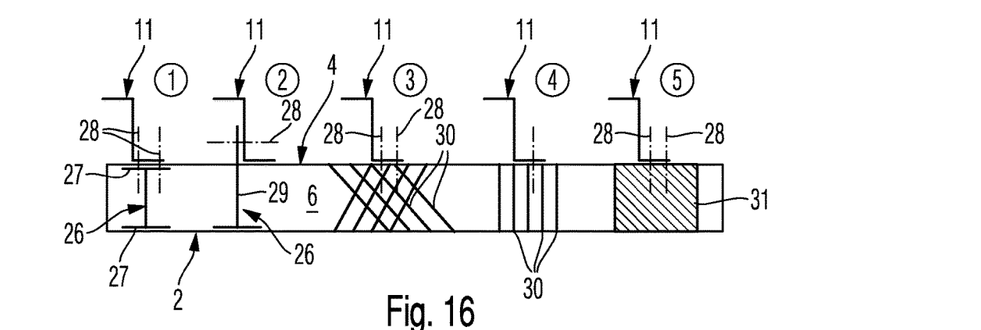
FIG. 16 is a cross-sectional view of a window panel exhibiting structural variations according to five different embodiments numbered 1 to 5.

Finally, FIG. 16 of the drawings illustrates five alternative embodiments for support elements 26 to be incorporated within the core 6 of the window panel 1. In the embodiment number 1, for example, an elongate support element 26 has an I-shaped cross-sectional profile extending within the core 6 parallel to the first and second outer layers 2, 4 such that flanges 27 of the I-shaped profile essentially abut the skins 2, 4. This construction is convenient for attachment of a rib 11 (e.g. shown here as Z-profile rib) via fastening elements 28, such as rivets. Embodiment number 2 shows a support element 26 having an inverted T-shaped cross-sectional profile, where the web 29 of the profile actually extends out of the core 6 and through the FRP skin 4 of the panel 1 for attachment of a rib 11 at the second (i.e. internal) side 5 of the panel, via rivets 28. Embodiment number 3 illustrates the use of pins 30 as support elements 26 within the foam core 6 inserted at angles to the FRP skins 2, 4, whereas the embodiment number 4 employs pins 30 as support elements, but arranged to extend perpendicular to a plane of the panel 1. Embodiment number 5 of FIG. 16, on the other hand, contemplates the use of block-like inserts 31 having a higher density than the foam core 6 arranged or extending at intervals within the core as support elements 26 for the window panel 1. In embodiments numbers 1 to 5, it will be appreciated that instead of fastening via rivets 28, an adhesive connection of the rib 11 to the skin 4 of the panel 1 (e.g. via contact adhesive) may also be used.

Although specific embodiments of the disclosure have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein. For example, the join between the first and second skins 2, 4 of the panel 1 in the monolithic regions 8, 9, 18 may optionally be achieved and/or supported by fastening elements, such as rivets. While fastening elements in the monolithic regions 8, 9, 18 are primarily contemplated for embodiments in which either or both of the first and second skins 2, 4 comprises a metal or a metal composite, this is also technically feasible for embodiments in which the first and second skins 2, 4 may comprise an FRP material.

In this document, the terms "comprise", "comprising", "include", "including", "contain", "containing", "have", "having", and any variations thereof, are intended to be understood in an inclusive (i.e. non-exclusive) sense, such that the process, method, device, apparatus or system described herein is not limited to those features or parts or elements or steps recited but may include other elements, features, parts or steps not expressly listed or inherent to such process, method, article, or apparatus. Furthermore, the terms "a" and "an" used herein are intended to be understood as meaning one or more unless explicitly stated otherwise. Moreover, the terms "first", "second", "third", etc. are used merely as labels, and are not intended to impose numerical requirements on or to establish a certain ranking of importance of their objects.

The invention claimed is:

1. A window panel for a body structure of a vehicle, comprising:
    a first skin extending over a first side of the panel to form an outer skin of the vehicle body structure;
    a second skin extending over a second side of the panel to form an inner skin of the vehicle body structure;
    a core located between a first surface of the first skin and a second surface of the second skin and covered by the first and second skins in a sandwich structure, wherein the first surface and the second surface face towards each other;
    at least one window aperture formed through the first skin, the core, and the second skin; and
    a reinforcing insert at or around a periphery of the at least one window aperture;
    wherein the first skin and the second skin both extend beyond opposite first and second ends of the core and are joined to one another to form monolithic first and second edge regions of the panel;
    wherein the first skin and the second skin extend beyond an inner edge of the core limiting the at least one window aperture formed through the core;
    wherein the first surface of the first skin and the second surface of the second skin are joined to one another to form a monolithic region at or around a periphery of the at least one window aperture;
    wherein the reinforcing insert overlaps the core, extends beyond the inner edge of the core, and is included between the first skin and the second skin in the monolithic region at or around a periphery of the at least one window aperture;
    wherein the monolithic region at or around a periphery of each window aperture forms an attachment region at which a window assembly is fixed in the panel by a retainer element formed as an oval-shaped or ring-shaped plate clamped over the window assembly.

2. The window panel according to claim 1, wherein the at least one window aperture is substantially surrounded by the core in the sandwich structure.

3. The window panel according to claim 1, wherein the first skin and/or the second skin extend over or cover the entire area of the panel.

4. The window panel according to claim 1, wherein the core is elongate and confined to extend in a central region of the panel between the monolithic first edge region and the monolithic second edge region of the panel.

5. The window panel according to claim 1, comprising a plurality of window apertures formed through the first skin, the core, and the second skin, wherein the plurality of window apertures are arranged spaced at intervals laterally adjacent one another along the panel.

6. The window panel according to claim 1, wherein the first skin comprises a fiber-reinforced composite, and/or wherein the second skin comprises a fiber-reinforced composite, and/or wherein the core comprises a solid foam having closed cells.

7. The window panel according to claim 1, wherein the window assembly includes a seal and at least one pane to cover the at least one window aperture, and wherein the seal seals against the at least one pane and the attachment region at the periphery of the at least one window aperture.

8. A vehicle having a body structure that includes one or more window panel according to claim 1.

* * * * *